(12) United States Patent
Lopez et al.

(10) Patent No.: US 11,325,312 B2
(45) Date of Patent: May 10, 2022

(54) BUILD MATERIAL SUPPLY UNIT WITH DISTANCE SENSOR

(71) Applicant: HEWLETT-PACKARD DEVELOPMENT COMPANY, L.P., Houston, TX (US)

(72) Inventors: Miguel Angel Lopez, Vancouver, WA (US); Pau Martin Vidal, Sant Cugat del Valles (ES); Carlos Perez, Sant Cugat del Valles (ES); Anna Torrent, Barcelona (ES); Guillermo Garcia Marcos, Sant Cugat del Valles (ES); Marius Valles, Barcelona (ES); Albert Mora Murciano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 810 days.

(21) Appl. No.: 16/062,854

(22) PCT Filed: Mar. 24, 2016

(86) PCT No.: PCT/EP2016/056589
§ 371 (c)(1),
(2) Date: Jun. 15, 2018

(87) PCT Pub. No.: WO2017/162294
PCT Pub. Date: Sep. 28, 2017

(65) Prior Publication Data
US 2019/0001575 A1    Jan. 3, 2019

(51) Int. Cl.
*B29C 64/393*    (2017.01)
*G01F 23/292*    (2006.01)
(Continued)

(52) U.S. Cl.
CPC .......... *B29C 64/393* (2017.08); *B29C 64/141* (2017.08); *B29C 64/165* (2017.08);
(Continued)

(58) Field of Classification Search
CPC ... B29C 64/393; B29C 65/16; B29C 65/1638; B29C 65/1641; B29C 65/1645;
(Continued)

(56) References Cited

U.S. PATENT DOCUMENTS 5,258,146 A    11/1993    Almquist et al.
9,233,507 B2    1/2016    Bibas
(Continued)

FOREIGN PATENT DOCUMENTS

DE    202013100830    6/2014
JP    H08156105    6/1996

OTHER PUBLICATIONS

Bikas, et al; "Additive Manufacturing Methods and Modelling Approaches: A Critical Review"; Jul. 6, 2015; https://www.researchgate.net/publication/282546806_Additive_manufacturing_methods_and_modelling_approaches_a_critical_review.

*Primary Examiner* — Stella K Yi
(74) *Attorney, Agent, or Firm* — HP Inc. Patent Department

(57) ABSTRACT

There is disclosed a build material supply unit, comprising: a supply chamber body enclosing a supply volume to contain a build material for additive manufacture; an electromagnetic distance sensor to determine a length parameter relating to a length of a beam pathway extending from an emitter of the sensor to a surface level of build material in the supply volume; and a reflector to reflect the beam pathway between the emitter and the surface level of build material; wherein the reflector is spaced apart from the emitter.

11 Claims, 6 Drawing Sheets

(51) Int. Cl.
- *B33Y 30/00* (2015.01)
- *B33Y 50/02* (2015.01)
- *G01B 11/02* (2006.01)
- *B29C 64/321* (2017.01)
- *B29C 64/165* (2017.01)
- *B33Y 10/00* (2015.01)
- *B29C 64/141* (2017.01)
- *B29C 64/205* (2017.01)

(52) U.S. Cl.
CPC .......... *B29C 64/205* (2017.08); *B29C 64/321* (2017.08); *B33Y 10/00* (2014.12); *B33Y 30/00* (2014.12); *B33Y 50/02* (2014.12); *G01B 11/026* (2013.01); *G01F 23/292* (2013.01)

(58) Field of Classification Search
CPC ............ B29C 35/0805; B29C 65/1441; B29C 65/1603; B29C 64/165; B29C 64/205; B29C 66/81268; B33Y 10/00; B33Y 50/02; G01B 11/026; G01F 23/292
See application file for complete search history.

(56) References Cited

U.S. PATENT DOCUMENTS

| | | |
|---|---|---|
| 2010/0156003 A1 | 6/2010 | Wahlstrom |
| 2014/0271328 A1* | 9/2014 | Burris .................... B33Y 10/00 419/53 |
| 2015/0130101 A1 | 5/2015 | Fiegener |
| 2015/0147424 A1* | 5/2015 | Bibas .................... B33Y 50/02 425/150 |
| 2015/0301517 A1 | 10/2015 | Chen et al. |
| 2015/0321419 A1 | 11/2015 | Linthicum et al. |

* cited by examiner

BUILD MATERIAL SUPPLY UNIT WITH DISTANCE SENSOR

BACKGROUND

Additive manufacturing systems that generate three-dimensional objects on a layer-by-layer basis have been proposed as a potentially convenient way to produce three-dimensional objects.

Three-dimensional objects generated by an additive manufacturing process may be formed in a layer-by-layer manner. In one example of additive manufacturing, an object may be generated by solidifying portions of layers of build material. In examples, the build material may be in the form of a powder, liquid or sheet material. Build material may be stored in a build material supply unit. A supply of build material in a build material supply unit may be replenished before it runs out, or the build material supply unit may be replaced.

In some such processes, energy may be applied to a build material. For example, energy may be applied to preheat the build material to a temperature which is close to its melting point. Energy may also be applied to cause melting, so that regions of the build material may fuse to form portions of an object.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. The build material may be powder-based and the properties of generated objects may depend on the type of build material and the type of solidification mechanism used. In a number of examples of such techniques including sintering techniques, build material is supplied in a layerwise manner and the solidification method includes heating the layers of build material to cause melting in selected regions. In other techniques, chemical solidification methods may be used.

In example additive manufacturing techniques, a print agent (also known as a coalescent agent or fusing agent) may be selectively ejected onto build material, for example using a print agent distributor such as an inkjet print head. The print agent may be capable of absorbing radiation (radiant heat energy) and transferring thermal energy to build material in contact with the print agent. This may cause the build material to fuse (also known as sinter, bind, cure, etc.). Print agent may be ejected onto a layer of build material in a pattern corresponding to a slice of a three-dimensional object, and the layer may be exposed to radiation to selectively fuse the build material to which print agent has been applied to form a slice of the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
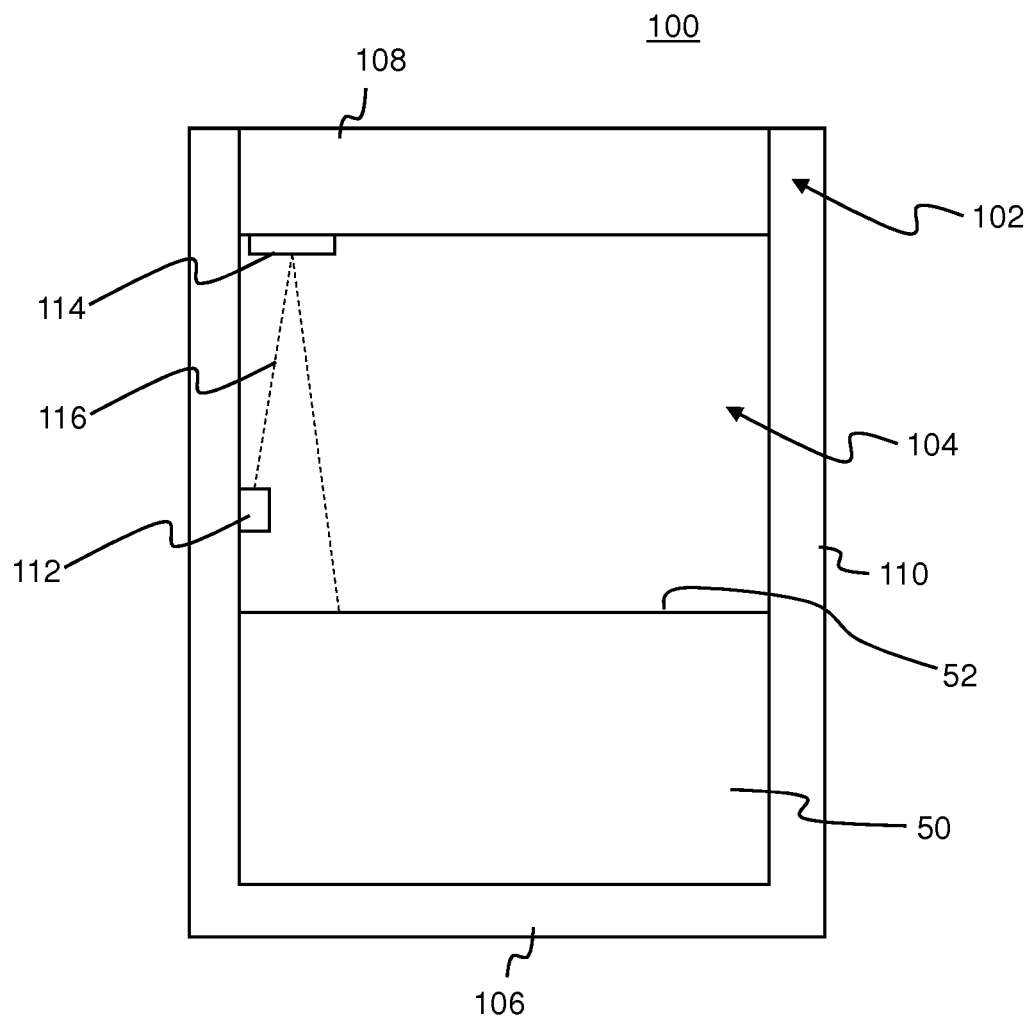
FIG. 1 is a schematic cross-sectional side view of an example build material supply unit.

FIG. 1 shows an example build material supply unit 100 comprising a supply chamber body 102 enclosing a supply volume 104 to contain a build material for additive manufacture. An example supply of build material 50 is shown in FIG. 1 for illustration purposes.

The supply chamber body 102 has an operational configuration in which it is generally upright and has a generally vertical extent from a lower floor portion 106 to an upper cap portion 108. A sidewall portion 110 extends between the lower floor portion 106 and the upper cap portion 108. The supply volume 104 is defined between the floor portion 106, the sidewall portion 110, and the cap portion 108 of the supply chamber body 102.

The supply chamber body 102 may be of any shape. For example, the supply chamber body 102 may be a cylinder, a cube, a cuboid, a triangular prism, a pentagonal prism, a hexagonal prism, an octagonal prism etc. In this particular example, the supply chamber body 102 is generally cuboidal.

An electromagnetic distance sensor 112, for example an infrared distance sensor or a laser distance sensor, is mounted to the sidewall portion at an intermediate height in the supply volume 104. In this example, the distance sensor 112 is to conduct a "time-of-flight" analysis for beams emitted along a beam pathway 116 and returned to the sensor 112. The sensor includes an integral emitter and receiver.

A reflector 114 is disposed at a level above the sensor 112 in the supply volume and is provided to reflect the beam pathway 116, received from the sensor 112 along a generally upward direction, downwardly towards a surface level 52 of the build material, when the build material 50 is received in the supply volume (i.e. when build material is present in, or disposed in, the supply volume).

In other words, the reflector 114 is to reflect the beam pathway downwardly towards the floor 106 of the supply chamber body 102, so that in use when build material is in the supply volume 104 (i.e. received therein), the beam pathway 116 extends from the sensor 112 to a surface level 52 of the build material 50 received in the supply volume 104.

As shown in FIG. 1, the sensor 112 is to emit an electromagnetic signal (for example, a pulse or beam of infrared light) along a beam pathway in a generally upward direction towards the reflector.

In use, build material 50 in the supply volume 104 defines a surface level 52 of the build material. The build material 50 may be originally provided into the supply volume through a port (not shown) in the supply chamber body 102, for example, a closable port in the cap portion 108.

The electromagnetic distance sensor 112 is caused to emit an electromagnetic signal along a generally upward direction corresponding to a first portion of the beam pathway 116. As shown in FIG. 1, the first portion of the beam pathway extends form the sensor 112 to the reflector 114. The reflector 114 reflects the signal and beam downwardly from the reflector 114 towards the surface level 52 of the build material 50 (or towards the floor 106 of the supply chamber 102). The surface level 52 of the build material reflects a portion of the electromagnetic signal along a third portion of the beam pathway from the surface level 52 of the build material back to the reflector 114. The reflector 114 then reflects the electromagnetic signal along a fourth portion of the beam pathway from the reflector 114 to the sensor 112, where the electromagnetic signal is received.

The electromagnetic sensor determines a length parameter relating to the length of the beam pathway from the sensor to the surface level 52 of the build material 50, for example, based on a time-of-flight analysis. In this particular example, the length parameter is the full length of the beam pathway 116 from the sensor 112 to the surface level 52 and back, via the reflector 114 (i.e. all four portions as described above). It will be appreciated that, if the distance between the sensor 112 and the reflector 114 is known, then the distance between the reflector and the surface level 52 of the build material 50 can be determined. For example, assuming the portions of the beam pathway 116 extend substantially vertically, the distance between the reflector 114 and the surface level 52 of the build material 50, $L_{RB}$, may be calculated as follows.

$$L_{RB}=0.5\times(L_{BP}-L_{SR}),$$

Where $L_{BP}$ is the length of the beam pathway, and $L_{SR}$ is the distance between the sensor 112 and the reflector 114. The amount of build material 50 within the supply volume 104 can therefore be determined, for example, as a function of the distance between the reflector 114 and the surface level 52 of the build material. In a simple example, the lateral cross-sectional area of the supply volume 104 may be constant, and therefore the volume of build material, $V_{BM}$, can be calculated as follows.

$$V_{BM}=(H_{SV}-L_{RB})\times A_{SV},$$

Where HSV is the height of the supply volume from the floor 106 to the reflector 114, and ASV is the cross-sectional area of the supply volume. In other examples, such a determination can take into account a variable cross-sectional area, and even a variable height of the reflector and/or the sensor, as will be described below.

Whilst the beam pathway 116 is shown in FIG. 1 as slightly inclined with respect to the vertical, it will be appreciated that the inclination may be minimal, and any inclination may be accounted for in the determination of the length parameter, and any subsequent determination of a supply parameter, as described below.

Figure 2:
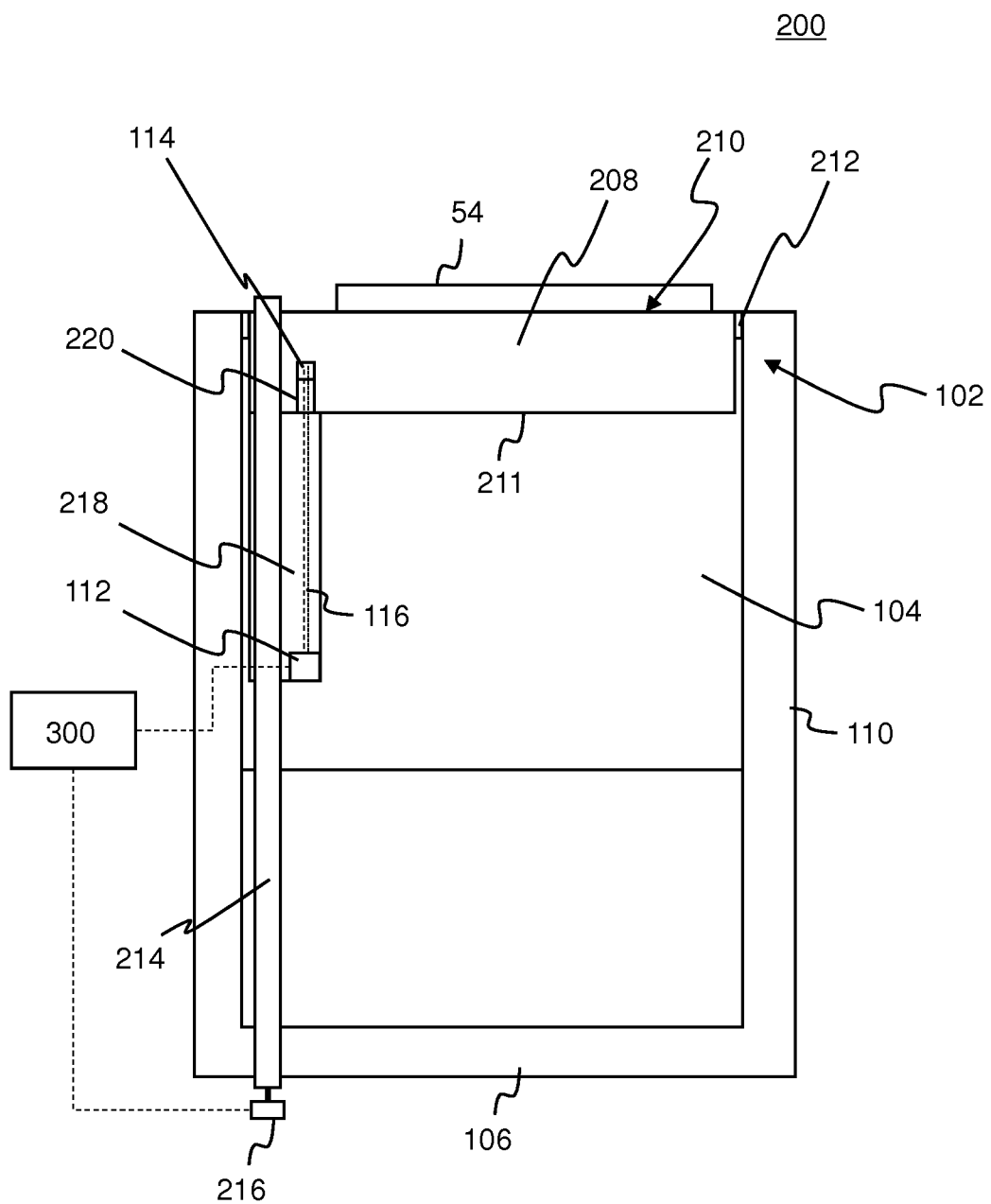
FIGS. 2-4 are schematic cross-sectional views of a further example build material supply unit.
Figure 3:
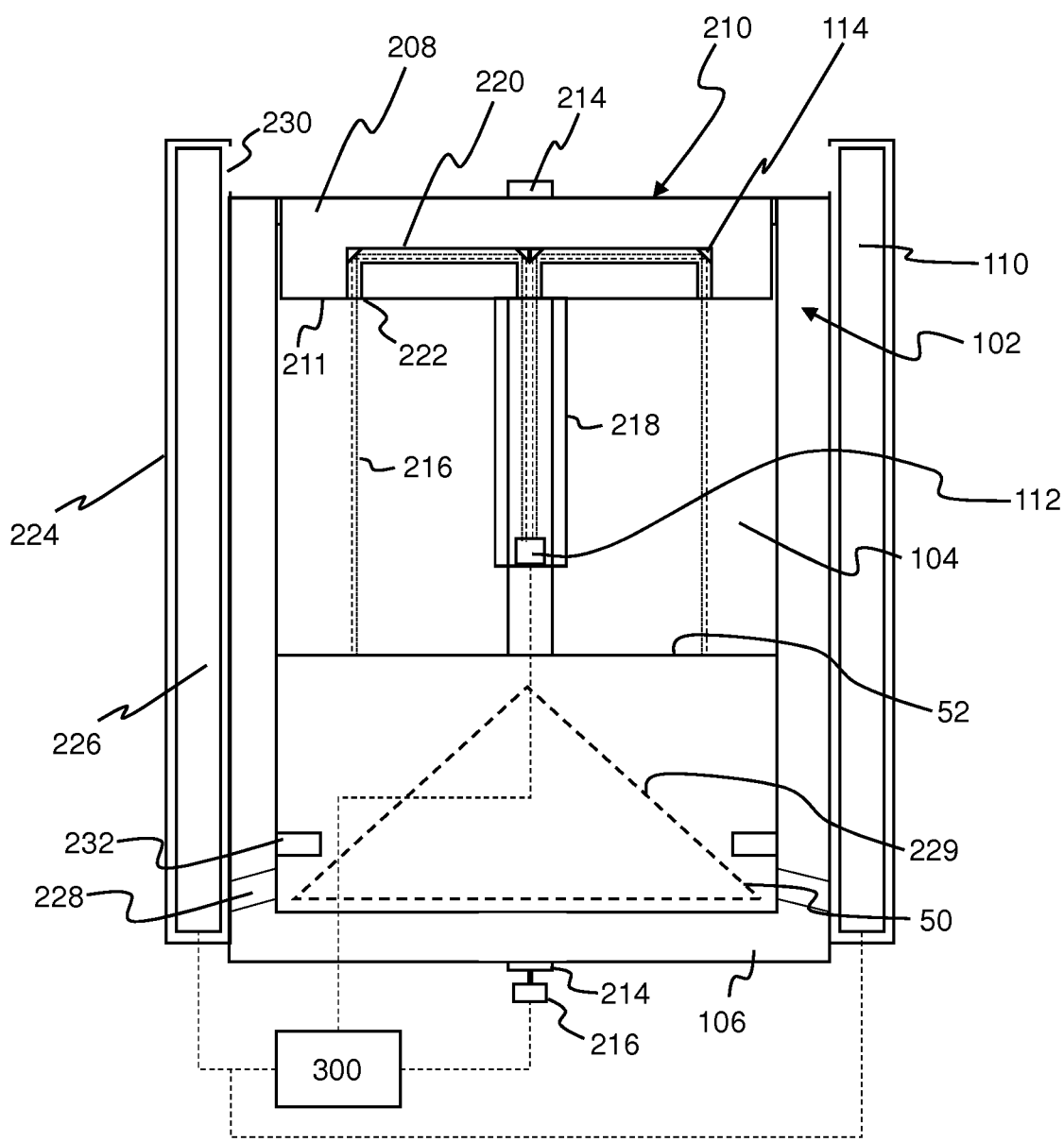
Figure 4:
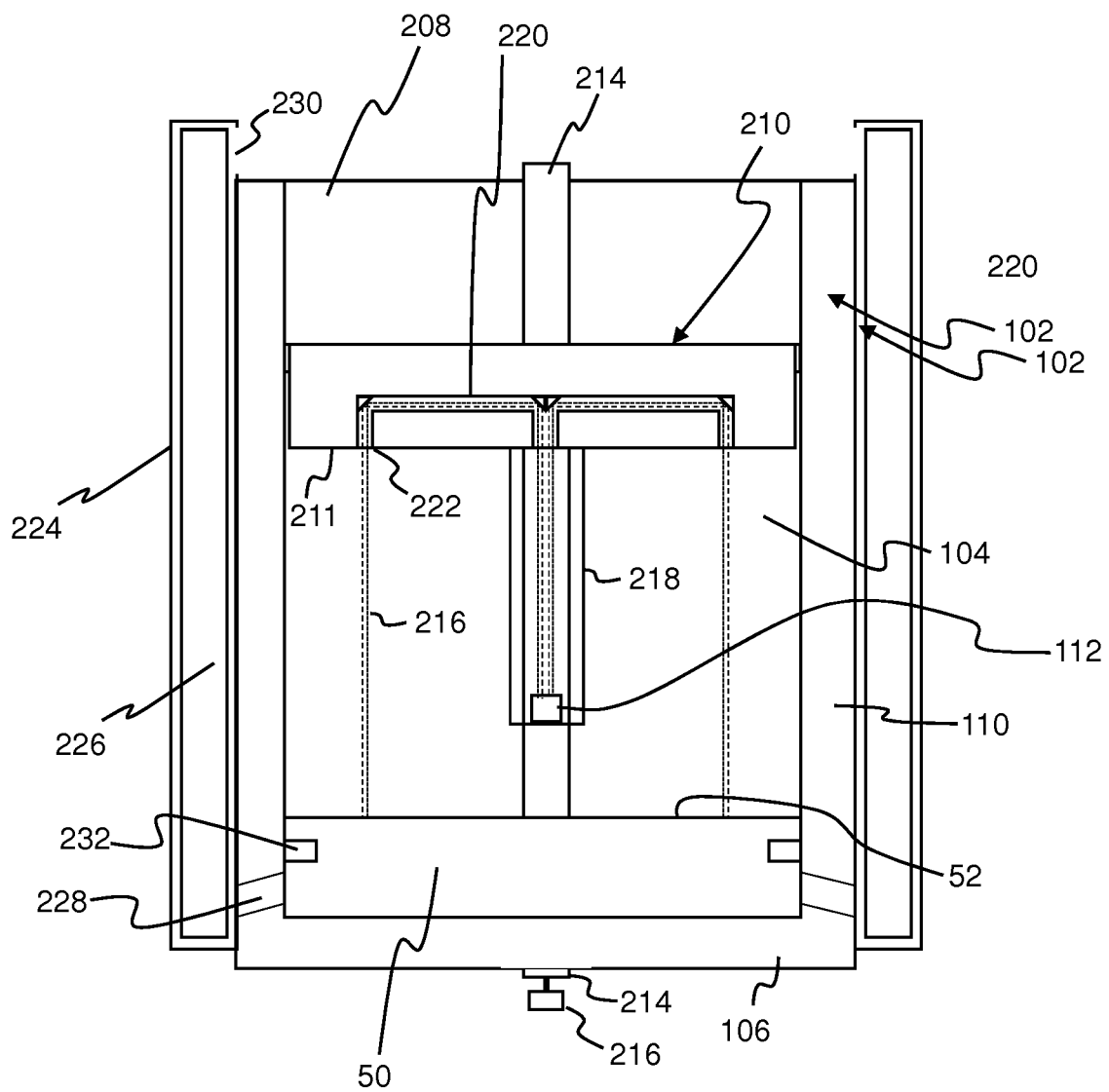

FIGS. 2 to 4 show a further example build material supply unit 200. The example build material supply unit 200 is similar to the unit 100 described above with respect to FIG. 1, and reference numerals for like components are retained in FIG. 2 and the description below. FIG. 2 shows a cross-sectional side view through a mid-portion of the supply unit 200 bisecting the sensor 112, which in this example is disposed at a central location towards a rear portion of the sidewall 110 (i.e. the left wall 110 in FIG. 2). FIG. 3 shows a cross-sectional front elevation of the supply unit 200, again bisecting the sensor 112.

The supply chamber body 102 is generally cuboidal, as described above. In this example, the upper cap portion 208 of the supply chamber body 102 is a moveable platform that is moveable relative the rest of the supply chamber body 102 (i.e. the sidewall portion 110 and the lower floor 106). The platform 208 has a lateral upper surface which defines a print bed 210 for receiving build material in an additive manufacturing process, for the layer-wise generation of an object 54. An object 54 is shown in FIG. 2 for illustration only. A seal 212 is coupled around the lateral perimeter of the platform 208 and sealingly engaged with an interior surface of the sidewall portion 110 of the supply chamber body 102.

In this example, the lateral cross-section of the supply body chamber 102, in particular of the sidewall portion 110, is constant so that the platform 208 remains in sealing engagement with the sidewall portion 110 as it moves downwardly relative the sidewall portion from a raised position shown in FIGS. 2 and 3, to a lowered position shown in FIG. 4. In this example, the interior surfaces of the sidewall portion 110 are substantially smooth to enable good sealing performance. Further, in this particular example no components, such as sensors, are installed in the interior walls of the sidewall portion 110, so that the interior surfaces are continuous. The term 'continuous' is used herein with respect to the interior surfaces of the sidewall portion to indicate that the surfaces are substantially free of projections and depressions in the profile of the surface or as caused by devices installed in the surface. The interior walls may be continuous over a vertical extent corresponding to the range of travel of the platform 208. Simple sealing arrangements (such as a seal around the perimeter of the platform 208) may be used to maintain the platform 208 in sealing engagement with the interior surface. The sensor 112 is spaced apart from the sidewall portion, and in this particular example is supported in a guide duct 218 which is moveable with the platform 208, as will be described below. Accordingly, the sensor does not present an obstacle to movement of the platform 208, and does not cause a discontinuity on an interior surface of the sidewall portion 210 with respect to the sealing arrangement. In this example, the sidewall portion 210 comprises four walls defining a cuboid cross section. A lower surface 211 of the platform 208 defines an upper boundary of the supply volume 104, and the platform 208 is vertically moveable to vary the volume of the supply volume 104.

As best shown in FIG. 2, the supply unit 200 comprises an actuator 214 for moving the platform 208 between the raised position and the lowered position. In this example, the actuator 214 is an endless screw extending generally vertically through the supply chamber body 102. The actuator 214 extends through the floor 106 (where it is sealed with the floor), through a rear portion of the supply volume 102 and through a rear portion of the platform 208. The actuator 214 is a threaded endless screw and extends through a threaded hole formed in the rear portion of the platform 208. The platform 208 is constrained from rotation relative the supply chamber body 102 by the sidewall portion 110 of the supply body chamber 102, so that rotation of the actuator 214 causes vertical movement of the platform 208. A driver 216, which in this example is a rotary motor, is provided to drive the actuator 214 in rotation relative the supply chamber body 102.

A guide duct 218 is coupled to and depends from the lower surface 211 of the platform 208. In this example, the guide duct is a five-walled duct of cuboid cross-section having an open upper end and a closed lower end. The upper end of the guide duct 218 abuts the lower surface 211 of the platform 208, whereas the lower end of the guide duct 218 is formed by a laterally planar wall with an opening for the actuator 214. The closed lower end may prevent ingress of gas and particulate matter (e.g. build material 50) into the guide duct 218. In other examples, the lower end of the guide duct 218 may be open. The guide duct may have a vertical extent in the operational configuration of the supply unit 200 which is less than the vertical extent of the supply volume 104 when the platform 208 is in the raised position, such that the guide duct 218 is moveable downward together with the platform 208. For example, the guide duct may have a vertical extent of approximately one third or one half of the vertical extent of the supply volume. In other examples, the vertical extent may be different, for example between 10% and 50% of the vertical extent of the supply volume, or between 20% and 40%. The guide duct 218 is mounted to the platform 208 so that it is spaced apart from the rear portion of the sidewall 110, so that it does not prevent sliding movement of the platform 208 within the sidewall 110, or engage therewith. In this example, the electromagnetic distance sensor 112 is received in a lower portion of the guide duct 218, and is mounted to the laterally planar wall closing the lower end of the guide duct 218. Accordingly, the guide duct separates the sensor from the build material, in particular, by defining a partitioned volume within the supply volume. In this example, the sensor 112 comprises an integral emitter and receiver. In other examples, there may be a separate emitter and receiver, which may be spaced apart from each other. In some examples, one of the emitter and the receiver may be disposed in a different portion of the supply unit 200 to the other, for example, mounted to a sidewall portion 110 of the supply chamber body 102, or disposed in a separate guide duct. The sensor 112 is coupled to a controller 300, shown schematically in FIGS. 2 and 3 (omitted from FIG. 4 for clarity), to control the sensor 112.

In examples, the sensor 112 may be disposed in a lower portion of the supply volume corresponding to a lower two thirds or less of the height of the supply volume (in examples with a moveable platform, the lower portion may be defined relative to the height of the supply volume with the moveable platform in the raised position). The lower portion of the supply volume may correspond to the lower 80%, the lower 70%, the lower 60%, or the lower 50%. In some examples, particularly when the cap portion is not moveable, the lower portion may correspond to the lower 30% or less, or the lower 20% of the supply volume. In examples, the sensor may be offset from a cap portion of the supply chamber body by a spacing corresponding to at least 20% of the height of the supply volume or more, at least 30%, at least 40%, or at least 50% (in examples where the cap portion is a moveable platform, the respective height of the supply volume may be the height when the moveable cap portion is in the raised position).

As described above, the sensor 112 is to emit and receive an electromagnetic signal along respective portions of a beam pathway 116 along a generally vertical direction within the guide duct 218. As best shown in FIGS. 3 and 4, the guide duct 218 aligns with a guide channel 220 in the platform 208 so that the beam pathway 116 extends from the guide duct 218 into the guide channel 220 and vice versa.

The guide channel 220 is to direct the beam pathway laterally through the platform 208 (as best shown in FIG. 3) and reflect the beam pathway downwardly towards the floor 106 or surface level 52 of the build material 50. In this example, there are two guide channels, each sharing a common first portion extending substantially vertically into the platform 208 with the other, and leading to a respective second portion extending substantially laterally through the platform 208 towards respective sides (left and right in FIGS. 3 and 4), and connecting with a respective third portion extending substantially vertically downwardly from the second portion and terminating at a port 222 in the lower side 211 of the platform 208. At the junctions between the respective portions, there are reflectors 114, which in this example are to reflect (and/or deflect) the beam pathway through respective angles of substantially 90°. In this example, the reflectors 114 are mirrors, but in other examples the reflectors may be prisms. In particular, a prism may occupy the cross-section of the guide channel 220, so as to seal the guide channel 220 and prevent ingress of gas or particulate matter into the guide channel 220. In further examples, the guide channel 220 may receive a solid light guide for optically guiding the electromagnetic signal to and from the sensor 112. As shown in FIGS. 3 and 4, the beam pathway 116 extends through the guide channel 220 and is reflected downwardly towards the surface level 52 of the build material in the supply volume 104. In this example, the beam pathway extends to meet the surface level 52 (or floor 106) towards respective lateral sides of the supply volume 104 in a rearward portion of the supply volume 104.

In this example, the build material supply unit 200 further comprises two supply conduits 224 at lateral sides of the supply chamber body 102. The supply chamber body 102 has two corresponding build material ports 228 in the sidewall portion 110 to discharge build material from respective lateral sides of the supply volume, at a rearward portion of the supply volume. In other examples, the build material ports 228 may be located elsewhere, but in some examples the location of the build material port or ports 228 may correspond to a position where the beam pathway is reflected to meet the surface level of the build material. It will be appreciated that any depression in the surface level of the build material may be more likely to occur in positions corresponding to (i.e. generally above) the location of the build material ports 228 from which build material is discharged. Accordingly, reflecting the beam pathway 116 to meet the surface level 52 of the build material in a corresponding location (i.e. at a position generally above the build material ports 228) may enable the most conservative estimate of the amount of remaining build material in the supply volume to be made.

As shown in FIG. 3, in broken lines, a build material guide 229 is provided in this particular example to guide build material towards the portions of the supply volume 104 where the build material ports 228 are located. In this example, the build material guide defines slopes that are inclined downwardly towards the build material ports 228. The build material guide 229 is shown in broken line as it is forward of the cross-section shown in FIG. 3, and is omitted form FIGS. 4 and 5 for clarity.

Further, in this example, the supply unit 200 comprises agitators 232 to periodically agitate the build material in the supply volume 104. Agitating the build material may cause the surface level 52 of build material therein to be evened. The controller 300 may periodically cause agitation of the build material, or may cause agitation prior to determining a length and/or supply parameter. In this example, there are two agitators 232 disposed in the supply volume 104 in the vicinity of the build material ports 228, in particular, they are mounted to the sidewall portion 110 at locations above the build material ports 228 (i.e. towards respective lateral sides of the supply volume 104, in a rearward and lower portion of the supply volume 104). In other examples, the agitators may be located elsewhere, and there may be a single agitator, or more than two agitators.

In this example, the supply conduits 224 are generally cylindrical and extend from a lateral port for receiving the build material upwardly to project above the upper portion of the supply chamber body. In an upper portion of each supply conduit 224 there is a print bed feed port 230 for supplying build material to the print bed defined by the platform 208. A build material distributor may be provided for distributing build material from the supply conduits 224 over the print bed, for example to form a layer of build material.

In this example, a build material conveyor 226 is disposed in each supply conduit 224. In this particular example, the build material conveyors 226 are Archimedes screws to lift build material by rotation of the screw within the respective conduit.

In other examples, there may be only one supply conduit and conveyor, or none. For example, the build material supply unit 200 may comprise a port from which build material may be withdrawn, and an external additive manufacturing apparatus may be provided with a supply conduit for receiving the build material. The build material conveyors 226 may be coupled to the controller 300 for controlling the transfer of build material.

In this example, the controller 300 is integrated within the build material supply unit 200. For example, the controller 300 may comprise a processor and a non-transitory machine-readable storage medium, such as memory, comprising machine-readable instructions that when executed by the processor cause the controller to control the operation of the build material supply unit 200, as described below with respect to FIG. 6. In this particular example, the controller 300 is to control the sensor 112, the movement of the platform 208 (as driven by the actuator 214 and drive 216), and the transfer of build material through the build material conveyors 226.

Figure 5:
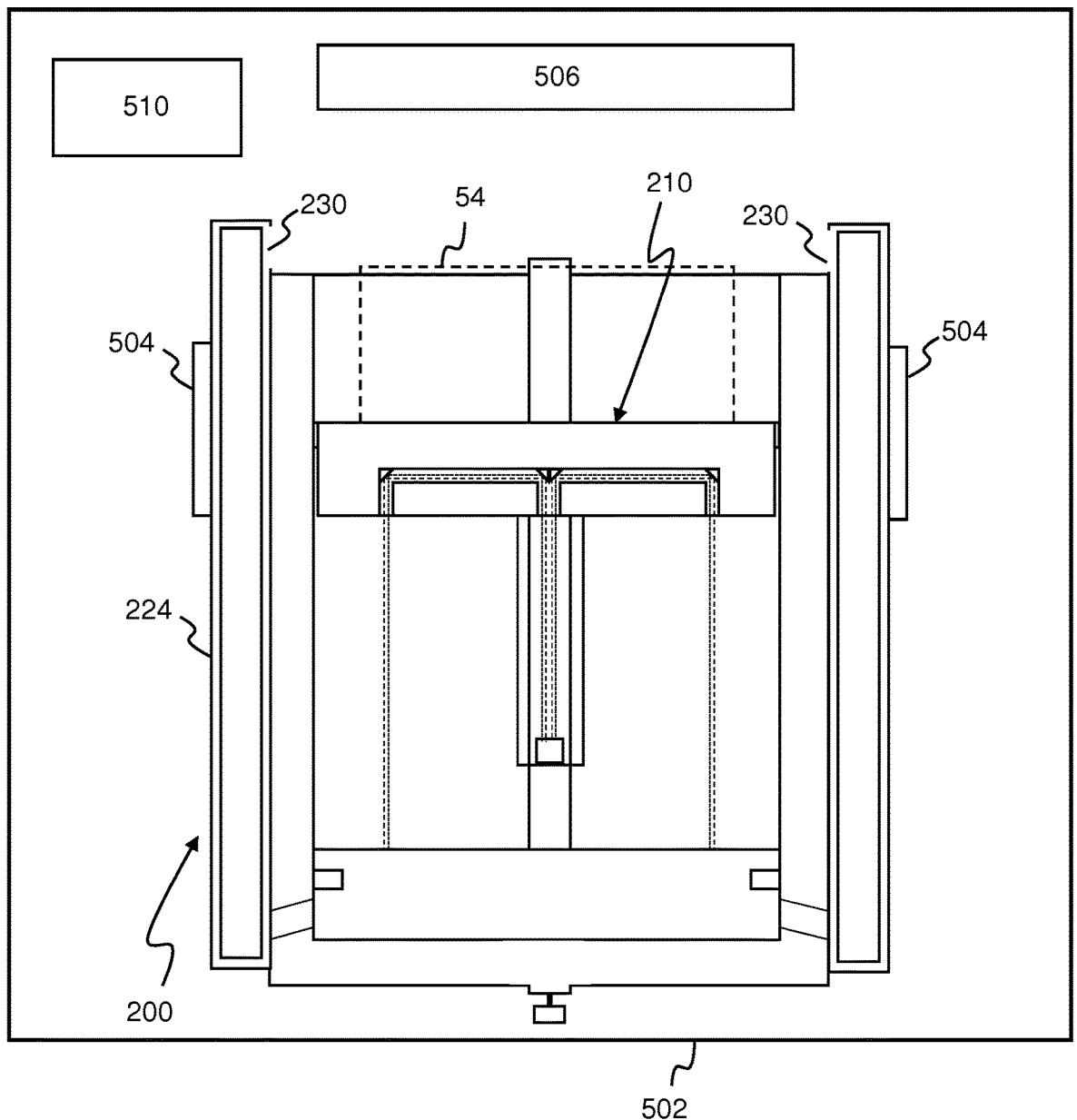
FIG. 5 is a schematic cross-sectional view of an example additive manufacturing apparatus.

FIG. 5 schematically shows additive manufacturing apparatus 500 comprising a build material supply unit 200 as described above received in a housing 502. The additive manufacturing apparatus 500 further comprises a pre-heater 504, which in this example is provided in the form of a pre-heating jacket 504 disposed around each of the two build material supply conduits 224 of the build supply unit 200. In other examples, such pre-heaters may be integral to the build supply unit 200.

In this example, the additive manufacturing apparatus 500 further comprises a fusing heater 506, in particular a radiation source to transfer radiant heat to build material on the print bed of the build supply unit 200.

In this example, a controller 510 corresponding to the controller 300 described above with respect to the build supply unit 200 is provided within the additive manufacturing apparatus 500, separate from the build supply unit 200 received therein. The controller 510 is to control the various components of the build supply unit 200 as described above, and there may be a control interface between the additive manufacturing apparatus 500 and the build supply unit 200 received therein accordingly. In addition, the controller 510 is to control the pre-heater 504 and the fusing heater 506. In other examples, the controller 510 may be provided in addition to a controller 300 of a build supply unit, and may interface with the controller 300 accordingly.

Example methods of determining a supply parameter relating to an amount of build material in a build material supply unit will now be described with reference to FIGS. 6 and 7.

Figure 6:
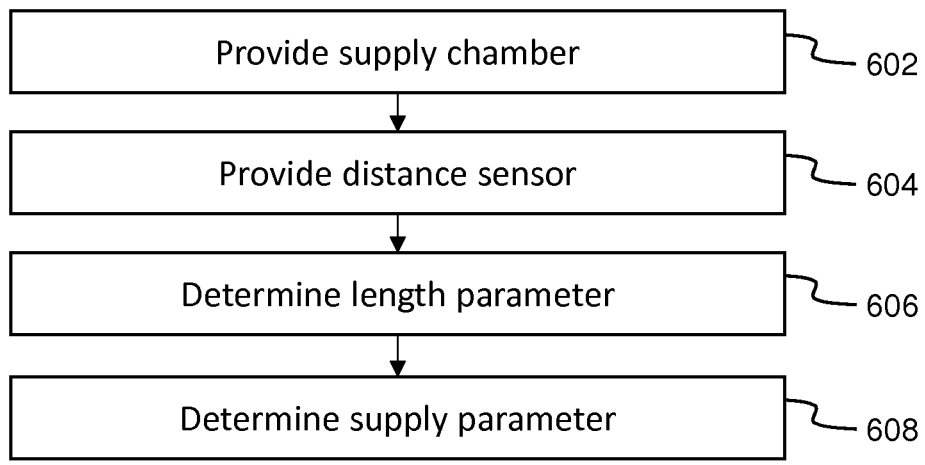
FIGS. 6 and 7 are flowcharts of example methods of determining a supply parameter.

FIG. 6 shows a flow chart of a method 600 of determining a supply parameter relating to an amount of build material in a build material supply unit, and will be described by way of example only with reference to the build material supply unit 200 described above with respect to FIGS. 2-4.

In block 602, a supply chamber 102 is provided enclosing a supply volume to contain build material for additive manufacture. In block 604, an electromagnetic distance sensor 112 is provided to determine a length parameter relating to a length of a beam pathway 116 extending from an emitter of the sensor to a surface level 52 of the build material.

In this particular example, build material is disposed in the supply volume. In other examples, there may be no build material in the supply volume, and the method may proceed to determine a supply parameter indicative of a zero amount of build material correspondingly. For example, it will be appreciated that the beam pathway may extend from the emitter of the electromagnetic distance sensor to the floor of the supply volume, in the absence of build material, and the absence of build material may be determined based on the corresponding length parameter.

In block 606, the electromagnetic distance sensor is caused to emit an electromagnetic signal along the beam pathway 116, and a length parameter relating to the length of the beam pathway 116 is determined by the electromagnetic distance sensor 112. In this example, the length parameter is determined as the length of the beam pathway, including a return portion of the beam pathway back to the electromagnetic distance sensor 112 (including reflection). In other examples, the length parameter may relate to the length, but may not directly correspond to the length as measured in standard units of length. For example, the length parameter may be returned as an output signal, for example, in units of mV (millivolts), which may be proportional to the length of the beam pathway 116. Such a length parameter would be adequate for subsequent determination of a supply parameter (as described below), with appropriate calibration. The controller 300 of the build material supply unit 200 may cause the electromagnetic signal to be emitted, and may determine the length parameter.

In block 608, a supply parameter relating to an amount of build material in the supply volume 104 of the supply chamber is determined. In this example, the controller 300 of the supply unit 200 processes the length parameter to determine the supply parameter. In this particular example, the controller receives a length parameter relating to the length of the beam pathway. The controller determines the distance between the lower side 211 of the platform 208 and the surface level 52 of the build material based on a predetermined distance from the sensor 112 to the port 222 in the underside of the lower side 211 of the platform 208, as described above.

In examples where the cap portion of the supply chamber does not move, it will be appreciated that a supply parameter such as the volume of build material may be determined based on a known correlation with the length parameter, for example, a correlation which takes into account the geometry of the supply volume, the beam pathway, and the position of the sensor within the supply volume. The correlation may be based on a formula, or may be stored in a lookup table or database, and may be based on empirical information or calculations. In other examples, the supply parameter may be a volume calculated directly (i.e. as a function of the length parameter), for example by determining the height of the build material in the supply volume based on the length of the beam pathway and the position of the sensor, a predetermined distance along the beam pathway from the sensor to the reflector 114 or lower surface of the cap portion 208, and a total height of the supply volume 104, as described above.

In this particular example, the controller 300 also determines a position parameter for the platform 208 relating to its vertical position, since the platform 208 is moveable, and the position parameter is used in the determination of the supply parameter. In this example, the supply parameter is determined based on predetermined data correlating the supply parameter, which in this example is the volume of build material, with the position parameter (which in this example is the vertical offset of the platform 208 from the raised position) and the length parameter (which in this example is the total length of the beam pathway). The position parameter can be determined by any suitable means, for example, by reference to the control of the actuator 214 to move the platform 208 (e.g. by integrating such movements from the raised position), or based on an output from a position sensor for monitoring the position of the platform 208, for example. In other examples, the supply parameter may be calculated using a formula defining the supply parameter as a function of the position parameter and the length parameter.

Figure 7:
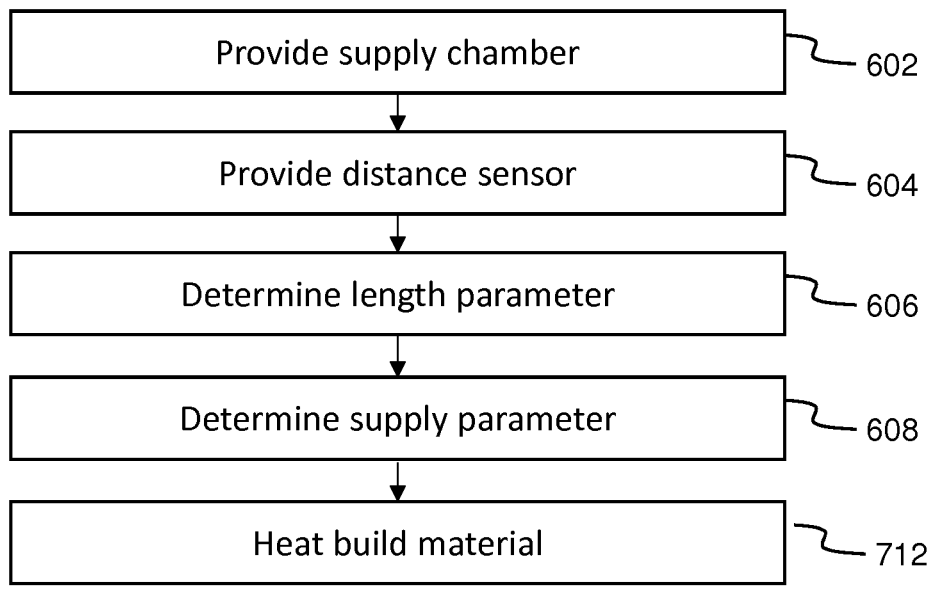

FIG. 7 shows a method 700 of determining a supply parameter relating to an amount of build material in a build material supply unit, and will be described by way of example only with reference to the additive manufacturing apparatus 500 described above with respect to FIG. 5.

The method 700 includes blocks 602 to 608 of the method 600 described above with respect to FIG. 6. The method 700 differs from the method 600 in that, in a further block 712, the controller 510 causes the heater pre-heater 504 to pre-heat the build material provided to the print bed 210, and the controller 510 intermittently causes the radiation source (e.g. a heat lamp) 506 to heat build material applied to the print bed 210 for selective solidification of the build material. Accordingly, the print bed 210 and the platform 208 to which it is coupled becomes heated relative to lower portions of the build material supply unit, so that there is a temperature gradient of decreasing temperature along a downward direction from the platform 208. For example, there may be a temperature gradient from approximately 200° C. at the platform 208 to approximately 50° C. in the lower half of the supply volume. In this particular example, an upper surface of the platform 208 (the print bed) is heated to approximately 200° C.; the lower surface 211 is approximately 120° C. (owing to thermal insulation in the platform 208); an interior location in the supply volume 150 mm below the platform 208 is approximately 90° C. (i.e. gas temperature), and a location in the supply volume approximately 300 mm below the platform is approximately 75° C. In this example, the sensor 112 is approximately 450 mm below the platform 208, and is at a temperature of approximately 50° C. In this example, the print volume has a height of approximately 1 m. Further, the position of the sensor 112 in this particular example may benefit from cooling through the sidewall portion 110 of the supply body chamber 102, and isolation by the guide duct 218 from the main portion of the supply volume 104 in which build material is disposed. Such separation between the sensor 112 and high-temperature regions of the build material supply unit 200 may improve the reliability, accuracy, and/or proper functioning of the sensor 112, which may be sensitive to temperature and operable within a limited temperature range, for example 5° C. to 80° C. It will be appreciated that a wide variety of temperature distributions may be experienced, and a temperature distribution may be influenced by factors such as insulation, pre-heat temperature, any cooling that may be provided, supply volume size and ambient conditions.

The methods described above may be initiated before a print operation, for example, to verify that there is sufficient information to complete the print operation. Further, the methods described above may be initiated at intermittent times during a print operation, to prevent inadvertent depletion of the build material supply, and/or on demand from a user. The print apparatus or a remote monitor may have a display to display information relating to the amount of build material within the build material supply unit, and/or an alert device (such as a warning light, display, or audible alarm) to indicate that the amount of build material is below a predetermined threshold.

Although examples have been described herein in which beams emitted from an electromagnetic sensor, or received at an electromagnetic sensor, are described as extending along an axial or generally elongate pathway, it will be appreciated that electromagnetic radiation is generally emitted as a field dispersed around an axis or pathway of maximum intensity.

Although examples have been described herein in which the beam pathway extends from an emitter disposed within a build material supply unit, in particular from within a supply volume of the build material supply unit, it will be appreciated that in other examples, the beam pathway may extend from an emitter outside the supply volume. For example, the beam pathway may extend from an emitter of a sensor disposed in additive manufacturing apparatus which receives a build material supply unit, and the beam pathway may extend from outside the build material supply unit into the supply volume, for example, through a guide channel in a cap portion or moveable platform of the supply unit.

References herein to a build material being received in the supply volume of a supply chamber body relate to a build material that is disposed in, or located in, the supply volume. References to build material "received in" the supply volume are not limited to the build material as initially received (i.e. upon loading the supply chamber), but refer to the build material as currently disposed in the supply volume. In particular, it will be appreciated that an amount of build material received in the supply chamber may vary, for example, as it is used in a print operation. The amount of build material in the supply volume may be zero. Further, it will be appreciated that the properties of sensors defined herein as to determine a length parameter of a beam pathway extending from the sensor to a surface level of build material, are unchanged if no build material is present (e.g. in an empty supply volume). Accordingly, such a definition of the sensor corresponds to the arrangement of the sensor and beam pathway with respect to the space (i.e. the supply volume) in which build material is to be received.

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a machine-readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A build material supply unit, comprising:
a supply chamber body enclosing a supply volume to contain a build material for additive manufacture;
an electromagnetic distance sensor to determine a length parameter relating to a length of a beam pathway extending from an emitter of the sensor to a surface level of build material in the supply volume; and
a reflector to reflect the beam pathway between the emitter and the surface level of build material;
wherein the reflector is spaced apart from the emitter; and
wherein the reflector is mounted on a moveable platform, an upper surface of the moveable platform comprising a print bed on which an object is formed;
the unit further comprising an optical guide channel extending through the moveable platform to split the beam pathway and direct the beam pathway toward both opposite edges of the moveable platform.

2. A build material supply unit according to claim 1, further comprising:
a controller to determine a supply parameter relating to an amount of build material in the supply volume based on the length of the beam pathway.

3. A build material supply unit according to claim 1, wherein the emitter and/or a receiver of the electromagnetic distance sensor is spaced apart from an upper boundary of the supply volume so that the reflector is disposed above the emitter and/or the receiver.

4. A build material supply unit according to claim 1, further comprising a guide duct extending below the moveable platform, wherein the emitter and/or a receiver of the electromagnetic distance sensor is disposed in the guide duct so that the beam pathway extends along the guide duct to the reflector mounted to the moveable platform.

5. A build material supply unit according to claim 1, wherein the moveable platform is moveable within an enclosing sidewall portion of the supply chamber, and wherein there is a seal between the moveable platform and the enclosing sidewall portion.

6. A build material supply unit according to claim 4, wherein an actuator to move the moveable platform extends along the guide duct.

7. A build material supply unit according to claim 1, wherein the emitter and/or a receiver of the electromagnetic distance sensor is disposed in a lower portion of the supply volume.

8. A build material supply unit according to claim 1, further comprising an agitator to even the surface level of build material in the supply volume.

9. Additive manufacturing apparatus comprising:
a supply chamber body enclosing a supply volume to contain a build material for additive manufacture;
a moveable platform forming a print bed, the moveable platform defining an upper boundary of the supply volume;
a heater to pre-heat build material provided to the print bed;
an electromagnetic distance sensor to determine a length of a beam pathway extending from an emitter of the sensor to a surface level of build material in the supply volume, wherein the electromagnetic distance sensor is spaced apart from the moveable platform;
a reflector mounted to the moveable platform to reflect the beam pathway between the emitter and the surface level of build material, wherein the reflector is spaced apart from the emitter;
a controller to determine a supply parameter relating to an amount of build material in the supply volume based on the length parameter and a position of the moveable platform; and
a guide duct extending from the moveable platform, wherein the emitter and a receiver of the electromagnetic distance sensor are disposed in the guide duct so that the beam pathway extends along the guide duct to the reflector mounted to the moveable platform.

10. A build material supply unit according to claim 1, the sensor further comprising a receiver located with and adjacent to the emitter to receive a beam from the emitter reflected by the surface level of build material.

11. A build material supply unit, comprising:
a supply chamber body enclosing a supply volume to contain a build material for additive manufacture;
an electromagnetic distance sensor to determine a length parameter relating to a length of a beam pathway extending from an emitter of the sensor to a surface level of build material in the supply volume;

a reflector to reflect the beam pathway between the emitter and the surface level of build material, wherein the reflector is spaced apart from the emitter and wherein the reflector is mounted on a moveable platform, an upper surface of the moveable platform comprising a print bed on which an object is formed; and a guide duct extending below the moveable platform so that the beam pathway extends along the guide duct;

wherein a bottom wall of the guide duct comprises an opening for an actuator that moves the moveable platform.

\* \* \* \* \*